(12) United States Patent
Egilmez et al.

(10) Patent No.: US 11,284,075 B2
(45) Date of Patent: *Mar. 22, 2022

(54) PREDICTION OF ADAPTIVE LOOP FILTER PARAMETERS WITH REDUCED MEMORY CONSUMPTION FOR VIDEO CODING

(71) Applicant: QUALCOMM Incorporated, San Diego, CA (US)

(72) Inventors: Hilmi Enes Egilmez, San Diego, CA (US); Nan Hu, San Diego, CA (US); Vadim Seregin, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,966

(22) Filed: Sep. 11, 2019

(65) Prior Publication Data
US 2020/0084444 A1 Mar. 12, 2020

Related U.S. Application Data

(60) Provisional application No. 62/730,504, filed on Sep. 12, 2018.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/503* (2014.11); *H04N 19/70* (2014.11)

(58) Field of Classification Search
CPC .... H04N 19/117; H04N 19/70; H04N 19/503; H04N 19/176; H04N 19/463;
(Continued)

(56) References Cited

U.S. PATENT DOCUMENTS

| 9,094,658 | B2 * | 7/2015 | Fu | H04N 19/10 |
| 2013/0022104 | A1 * | 1/2013 | Chen | H04N 19/61 |
| | | | | 375/240.02 |

(Continued)

FOREIGN PATENT DOCUMENTS

| EP | 0340041 A2 * | 11/1989 | .......... H03M 7/3084 |
| WO | 2018122092 A1 | 7/2018 | |

OTHER PUBLICATIONS

Tsai et al., "Adaptive Loop Filtering for Video Coding" IEEE Signal Processing vol. 7 No. 6 Dec. 2013 (Year: 2013).*

(Continued)

*Primary Examiner* — Dramos Kalapodas
(74) *Attorney, Agent, or Firm* — Shumaker & Sieffert, P.A.

(57) ABSTRACT

A device for decoding video data includes a memory configured to store video data and one or more processors implemented in circuitry and configured to store sets of adaptive loop filter (ALF) parameters in a one-dimensional array in the memory, the one-dimensional array having a predefined size of N memory elements, N being a positive integer value, wherein the one or more processors are configured to store, in one or more of the memory elements of the array, both corresponding ALF parameters and a temporal layer identifier (ID) value indicating a temporal layer from which the corresponding ALF parameters are to be estimated; decode one or more blocks of the video data; and filter the one or more blocks using the ALF parameters of the one-dimensional array. The device may further encode
(Continued)

the one or more blocks prior to decoding the one or more blocks.

30 Claims, 7 Drawing Sheets

(51) Int. Cl.
*H04N 19/70* (2014.01)
*H04N 19/503* (2014.01)
(58) Field of Classification Search
CPC .................. H04N 19/82; H04N 19/423; H04N 19/00684; H04N 19/80; H04N 19/593
See application file for complete search history.

(56) References Cited

U.S. PATENT DOCUMENTS

| | | | | |
|---|---|---|---|---|
| 2013/0113880 | A1* | 5/2013 | Zhao | H04N 19/463 348/43 |
| 2014/0092978 | A1* | 4/2014 | Bugdayci | H04N 19/30 375/240.16 |
| 2015/0326865 | A1* | 11/2015 | Yin | H04N 19/187 375/240.13 |
| 2015/0382018 | A1* | 12/2015 | Hendry | H04N 19/46 375/240.12 |
| 2016/0234492 | A1* | 8/2016 | Li | H04N 19/82 |
| 2018/0192050 | A1 | 7/2018 | Zhang et al. | |
| 2019/0166370 | A1 | 5/2019 | Xiu et al. | |
| 2019/0273921 | A1* | 9/2019 | Abe | H04N 19/117 |
| 2019/0373258 | A1 | 12/2019 | Karczewicz et al. | |
| 2020/0029096 | A1* | 1/2020 | Rusanovskyy | H04N 19/98 |
| 2020/0068196 | A1 | 2/2020 | Zhang et al. | |
| 2020/0145648 | A1* | 5/2020 | Lee | H04N 19/593 |
| 2020/0204800 | A1 | 6/2020 | Hu et al. | |
| 2020/0213619 | A1* | 7/2020 | Aono | H04N 19/124 |
| 2021/0014480 | A1* | 1/2021 | George | H04N 19/117 |

OTHER PUBLICATIONS

Chih-Ming Fu et al., (hereinafter Fu) (U.S. Pat. No. 9,094,658) and further in view of Jiangle Chen et al., (hereinafter Chen) "Algorithm Description of Joint Exploration Test Model 2" Doc. JVET-B1001_v3, San Diego CA, USA Feb. 20-26, 2016 ( Year: 2016).*
Chih-MingFu et al.,(U.S. Pat. No. 9,094,658)andfurtherinviewofJiangleChenetal., (hereinafterChen)"Algorithm Descriptionofjointexplorationtestmodel2"Doc.JVET-B1001_v3,SanDiegoCA,USAFeb. 20-26, 2016( Year:2016) (Year: 2016).*
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.
Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019, 488 pages.
Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Chen J., et al., "Algorithm Description of Joint Exploration Test Model 7 (JEM7)", JVET-G1001-V1, Joint Video Exploration Team (JVET)Of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].
Ergen S., "ZigBee/IEEE 802.15.4 Summary", Sep. 10, 2004, 37 Pages.
Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.
Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415-v2, 14th Meeting: Geneva, CH, Mar. 19-27, 2019, 16 pages.
Hu N., et al., "Coding Tree Block based Adaptive Loop Filter", Joint Video Experts Team (JVET) of ITU-T SG 16 WP 3 and ISO/IEC JTC 1/SC 29/WG 11, JVET-M0429, 13th Meeting: Marrakech, MA, Jan. 9-18, 2019, pp. 1-12.
Hu (Qualcomm) N., et al., "CE2.3 and CE2.4: Fixed Filters, Temporal Filters, CU-Level Control and Low-Latency Encoder for ALF", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0391, Oct. 1, 2018 (Oct. 1, 2018), 37 Pages, XP030194208, Retrieved from the Internet: URL: http://phenix.int-evry.fr/jvet/doc_end_user/documents/12_Macao/wg11/JVET-L0391-v2.zip JVET-L0391-v2.docx [retrieved on Oct. 1, 2018] section 2.1.2.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/050836—ISA/EPO—dated Jan. 7, 2020.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, , May 26-Jun. 1, 2016, 4 pages.
Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017].
Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/ ., No. JVET-B0060, 6 pages.
Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

(56) References Cited

OTHER PUBLICATIONS

Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Wiegand T., et al., "WD3: Working Draft 3 of High-Efficiency Video Coding," Document JCTVC-E603, 5th Meeting: Geneva, CH, Mar. 16-23, 2011, 239 pages.

Zhang, et al., "ALF Temporal Prediction with Temporal Scalability," Joint Video Exploration Team {JVET) of ITU-T SG 16 WP 3 and ISO/IEC JTC 1/SC 29/WG 11, Document No. JVET-E0104, 5th Meeting; Geneva, CH, Jan. 12-20, 2017, last updated Jan. 14, 2017, 4 Pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415, 14th Meeting: Geneva, CH, Mar. 19-27, 2019, pp. 1-6.

* cited by examiner

PREDICTION OF ADAPTIVE LOOP FILTER PARAMETERS WITH REDUCED MEMORY CONSUMPTION FOR VIDEO CODING

This application claims the benefit of U.S. Provisional Application No. 62/730,504, filed Sep. 12, 2018, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques that may reduce memory usage of temporal prediction in adaptive loop filtering (ALF). As compared to temporal prediction in adopted in JEM 7, the described techniques may provide significant memory reduction with little or no loss in compression performance. The techniques of this disclosure may be used to develop more practical implementations of ALF in advanced video codecs, such as extensions of H.265/HEVC and next generation video coding standards including H.266/VVC.

In one example, a method of decoding video data includes storing sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and a temporal layer identifier (ID) value indicating a temporal layer from which the corresponding ALF parameters are to be estimated; decoding one or more blocks of video data; and filtering the one or more blocks using the ALF parameters of the one-dimensional array.

In another example, a device for decoding video data includes a memory configured to store video data and one or more processors implemented in circuitry and configured to store sets of adaptive loop filter (ALF) parameters in a one-dimensional array in the memory, the one-dimensional array having a predefined size of N memory elements, N being a positive integer value, wherein the one or more processors are configured to store, in one or more of the memory elements of the array, both corresponding ALF parameters and a temporal layer identifier (ID) value indicating a temporal layer from which the corresponding ALF parameters are to be estimated; decode one or more blocks of the video data; and filter the one or more blocks using the ALF parameters of the one-dimensional array. The device may further encode the one or more blocks prior to decoding the one or more blocks.

In another example, a computer-readable storage medium has stored thereon instructions that, when executed, cause a processor to store sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and a temporal layer identifier (ID) value indicating a temporal layer from which the corresponding ALF parameters are to be estimated; decode one or more blocks of video data; and filter the one or more blocks using the ALF parameters of the one-dimensional array.

In another example, a device for decoding video data includes means for storing sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and a temporal layer identifier (ID) value indicating a temporal layer from which the corresponding ALF parameters are to be estimated; means for decoding one or more blocks of video data; and means for filtering the one or more blocks using the ALF parameters of the one-dimensional array.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). An HEVC draft specification, referred to as HEVC WD hereinafter, is available from phenix.int-evry.fr/jct/doc_end_user/documents/14_Vienna/wg11/JCTVC-N1003-v1.zip. The HEVC standard was finalized in January 2013.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. Reference software, i.e., Joint Exploration Model 7 (JEM 7), is available from jvet.hhi.fraunhofer.de/svn/svn_HMJEMSoftware/tags/HM-16.6-JEM-7.0/

In the field of video coding, it is common to apply filtering to enhance the quality of a decoded video signal. The filter can be applied as a post-filter, where filtered frame is not used for prediction of future frames or in-loop filter, where filtered frame is used to predict future frame. A filter can be designed for example by minimizing the error between the original signal and the decoded filtered signal. As in transform coefficients, the coefficients of the filter h(k, l), k=−K, . . . , K, l=−K, . . . K may be quantized according to:

$$f(k,l) = \text{round}(\text{normFactor} \cdot h(k,l)).$$

The quantized transform coefficients may then be coded and send to the decoder. The normFactor may be equal to $2^n$. Larger values of normFactor may lead to more precise quantization. As a result, the quantized filter coefficients f(k, l) may provide better performance. However, very large values of normFactor produce coefficients f(k, l) generally require more bits to transmit.

In the decoder, the decoded filter coefficients f(k, l) are applied to the reconstructed image R(i, j) as follows $$\tilde{R}(i,j) = \sum_{k=-K}^{K}\sum_{l=-K}^{K} f(k,l) R(i+k, j+l) \Big/ \sum_{k=-K}^{K}\sum_{l=-K}^{K} f(k,l), \quad (1)$$

where i and j are the coordinates of the pixels within the frame.

Figure 1:
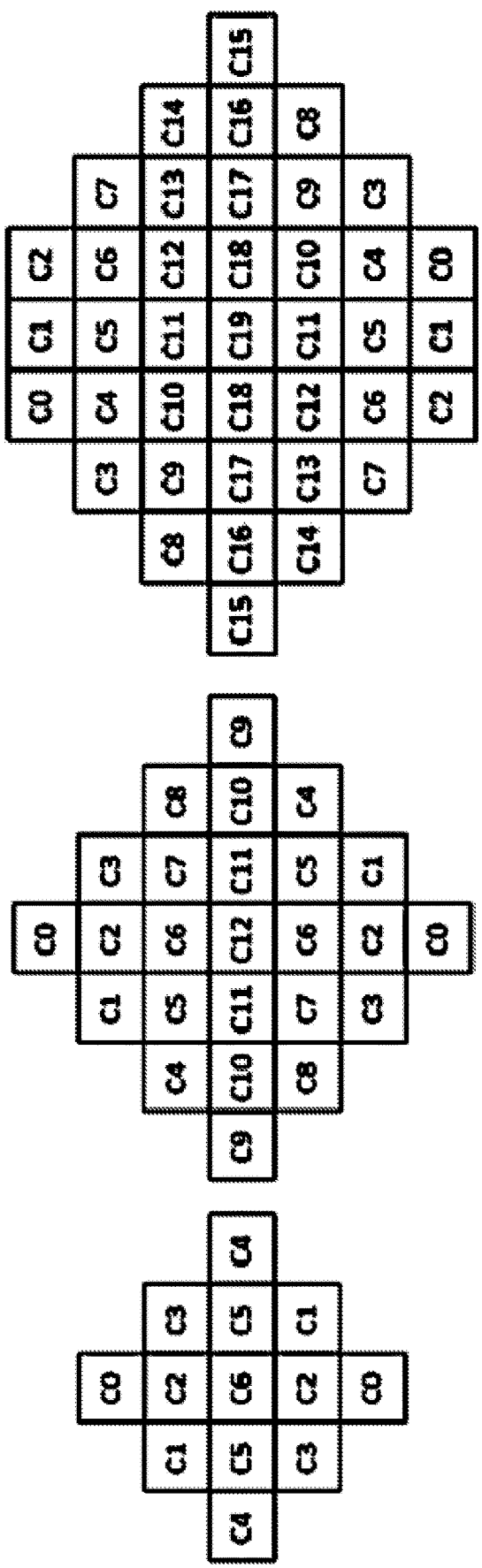
FIG. 1 is a conceptual diagram illustrating example adaptive loop filter (ALF) supports.

FIG. 1 is a conceptual diagram illustrating example adaptive loop filter (ALF) supports. The in-loop adaptive filter was evaluated in HEVC stage, but not included in the final version.

The in-loop adaptive loop filter employed in JEM was originally proposed in J. Chen, Y. Chen, M. Karczewicz, X. Li, H. Liu, L. Zhang, X. Zhao, "Coding tools investigation for next generation video coding," SG16-Geneva-C806, January 2015. The basic idea is the same as the ALF with block-based adaption in HM-3 [3]. For the luma component, 4×4 blocks in the whole picture are classified based on 1D Laplacian direction (up to 3 directions) and 2D Laplacian activity (up to 5 activity values). The calculation of direction Dir_b and unquanitzed activity Act_b is shown in equation (2) through (5), where $\hat{I}\_(i,j)$ indicates a reconstructed pixel with relative coordinate (i,j) to the top-left of a 4×4 block. Act_b is further quantized to the range of 0 to 4 inclusively as described in T. Wiegand, B. Bross, W.-J. Han, J.-R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011.

$$V_{ij} = |\hat{I}_{i,j} \times 2 - \hat{I}_{i,j-1} - \hat{I}_{i,j+1}| \quad (2)$$

$$H_{ij} = |\hat{I}_{i,j} \times 2 - \hat{I}_{i-1,j} - \hat{I}_{i+1,j}| \quad (3)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (4)$$

$$Act_b = \sum_{i=0}^{3}\sum_{j=0}^{3} \left(\sum_{m=i-1}^{i+1}\sum_{n=j-1}^{j+1} (V_{m,n} + H_{m,n})\right) \quad (5)$$

In total, each block can be categorized into one out of 15 (5×3) classes and an index is assigned to each 4×4 block according the value of Dir_b and Act_b of the block. Therefore, up to 15 sets of ALF parameters could be signaled for the luma component of a picture. To save the signaling cost, the groups may be merged along group index value. For each merged group, a set of ALF coefficients is signaled. Up to three circular symmetric filter shapes (as shown in FIG. 1) are supported.

For both chroma components in a picture, a single set of ALF coefficients is applied and the 5×5 diamond shape filter is always used.

At decoder side, each pixel sample $\hat{I}_{i,j}$ is filtered, resulting in pixel value $I'_{i,j}$ as shown in equation (6), where L denotes filter length, $f_{m,n}$ represents filter coefficient and o indicates filter offset.

$$I'_{i,j} = (\sum_{m=-L}^{L}\sum_{n=-L}^{L} f_{m,n} \times \hat{I}_{i+m,j+n} + o) >> (BD_F - 1) \quad (6)$$

wherein $(1<<(BD_F-1)) = \sum_{m=-L}^{L}\sum_{n=-L}^{L} f(m, n)$ and $(o = (1<<(BD_F-2)))$.

In JEM2, the bit-depth, denoted by $BD_F$ is set to 9, which means the filter coefficient could be in the range of [−256, 256].

The ALF coefficients of previously coded pictures are stored and allowed to be reused as ALF coefficients of a current picture. The current picture may choose to use ALF coefficients stored for the reference pictures and then bypass the ALF coefficients signalling. In this case, only an index to one of the reference pictures is signalled, and the stored ALF coefficients of the indicated reference picture are simply inherited for the current picture. To indicate the usage of temporal prediction, one flag is firstly coded before sending the index.

In the design of JEM 7, ALF parameters from at most six previous pictures/slices are stored in a separate array for each temporal layer. For example, if there are 5 temporal layers in a hierarchical B/P coding structure (which is the case in random access setting used in current video coding standardization), both encoder and decoder use a 5×6 memory array, so that in total, there are 30 memory elements to store previously obtained ALF parameters.

The conventional design of JEM 7 effectively deletes the stored ALF parameters when an IRAP picture (I-frame) is encoded/decoded. To avoid duplication, ALF parameters are stored in the memory only if they are newly obtained through signalling at the decoder side (at the encoder side, new parameters are obtained via estimation/training). Storing of parameters operates in a first-in-first-out (FIFO) order (that is, a FIFO fashion), so if the array is full, a new set of ALF parameter values overwrites the oldest parameters, in the decoding order.

Figure 2:
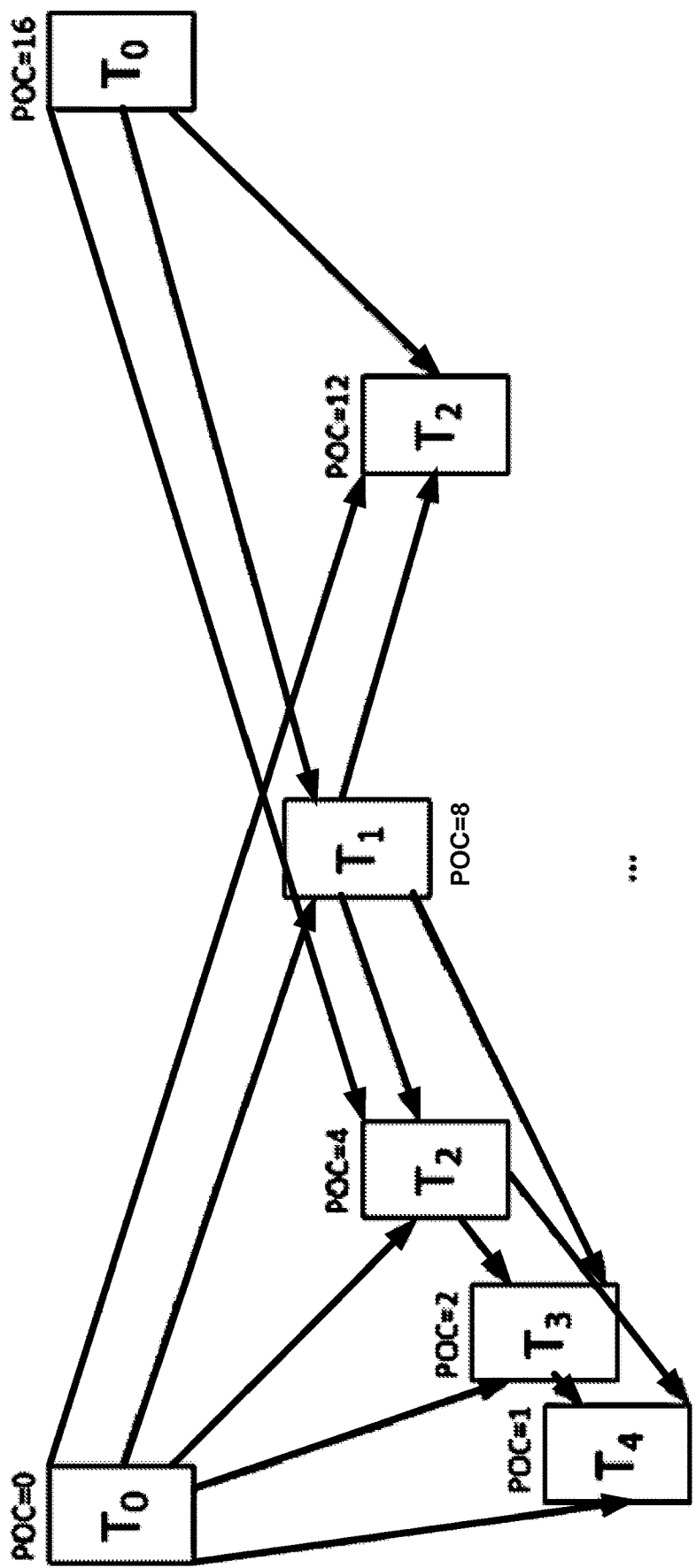
FIG. 2 is a conceptual diagram illustrating example temporal layers in a hierarchical frame structure.

FIG. 2 is a conceptual diagram illustrating example temporal layers in a hierarchical frame structure.

One example reason for using a two-dimensional (2D) array (in memory) for storing ALF parameters is to preserve temporal scalability in a hierarchical a B/P frame coding structure. As shown in FIG. 2, a frame at layer $T_i$ cannot depend on (e.g., cannot be predicted from) a frame at layer $T_k$ for i<k. In other words, a frame/slice at a lower temporal layer (e.g., $T_2$) cannot depend on frames/slices at higher layers (e.g., $T_3$ and $T_4$). The current temporal prediction in ALF, which is covered in U.S. application Ser. No. 15/861,165, filed Jan. 3, 2018, published as U.S. Patent Publication No. 2018/0192050, preserves temporal scalability by simply storing ALF parameters obtained from different temporal layers in different rows of the 2-D array and ensuring that those parameters are used without breaking dependency structure in hierarchical B/P frames.

The current design of temporal prediction may require a large amount of memory. Specifically, a 5×6 array with 30 memory elements may be needed in both encoder and decoder to store ALF parameters. The techniques of this disclosure may significantly reduce the memory requirement by using a 1D array, while still preserving the temporal scalability.

Figure 3:
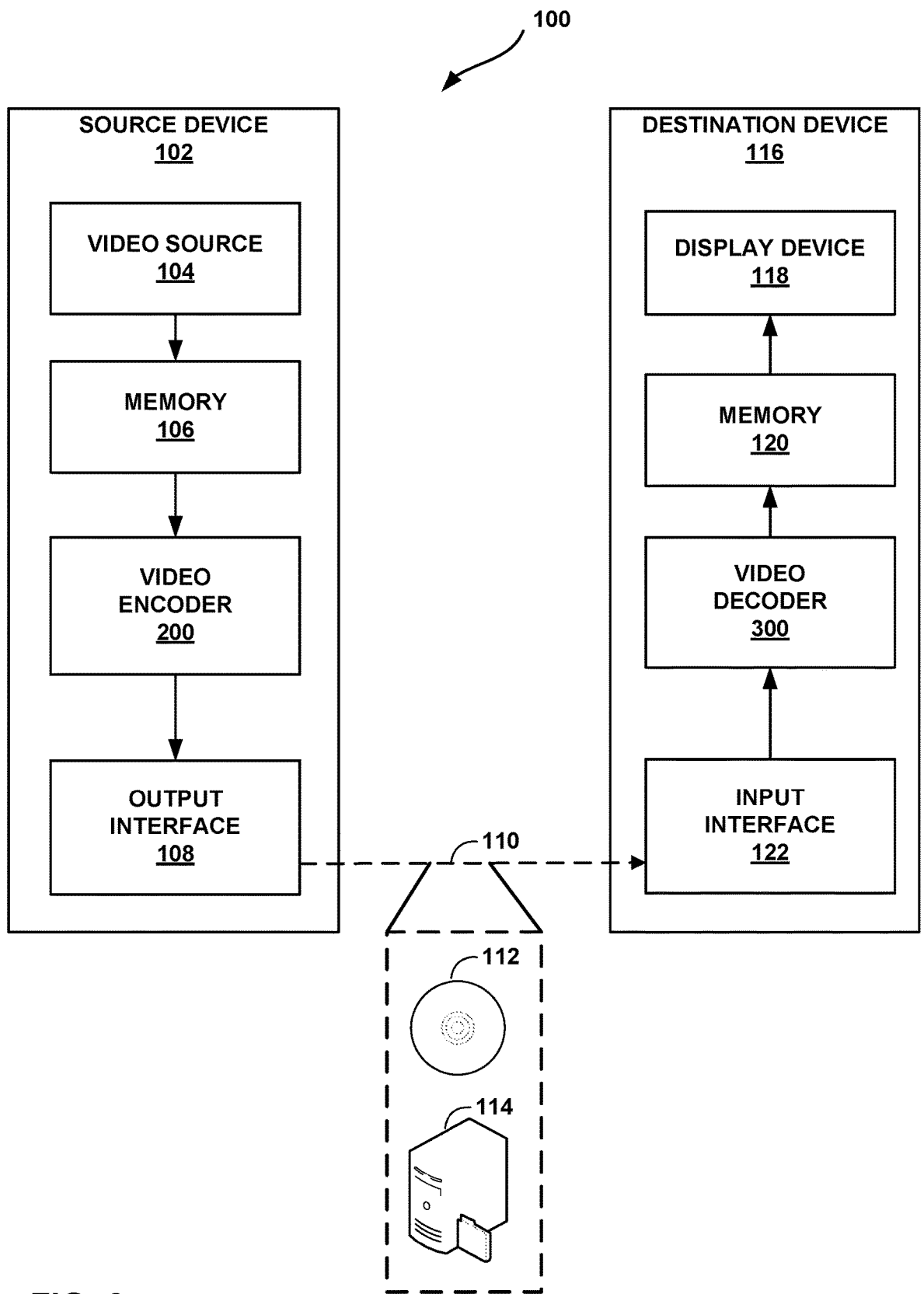
FIG. 3 is a block diagram illustrating an example video encoding and decoding system that may perform the techniques of this disclosure.

FIG. 3 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 3, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 3, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for temporal prediction of adaptive loop filter parameters, which may reduce memory consumption. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 3 is merely one example. In general, any digital video encoding and/or decoding device may perform techniques for temporal prediction of adaptive loop filter parameters, which may reduce memory consumption. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream of computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 3, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or multi-type tree (MTT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT or MTT structure for the luminance component and another QTBT or MTT structure for both chrominance components (or two QTBT or MTT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to store ALF parameters in a single 1-D array (or buffer) of size N, along with temporal layer ID values (tId), as shown in Table 1 below:

TABLE 1

| Alf($P_1$, $tId_1$) | Alf($P_2$, $tId_2$) | Alf($P_3$, $tId_3$) | ... | Alf($P_N$, $tId_N$) |

In the example of Table 1, each memory element of the 1-D array stores (i) ALF parameters and (ii) the temporal layer ID (tId), indicating from which layer the corresponding ALF parameters are estimated. The temporal layer information may be stored to ensure that an ALF parameter obtained from a higher temporal layer (e.g., tId=4) is not used for encoding/decoding a frame/slice at a lower temporal layer (e.g., tId=3).

Video encoder 200 and video decoder 300 may be configured to apply any of the following techniques, alone or in any combination, to load, store, and/or use ALF parameters for temporal prediction:

1. To be used in temporal prediction of ALF parameters, an array may store parameters from either B- or P-slices.
2. In the array, the entries of ALF parameters may be stored in a certain order (e.g., by following the decoding order). When all the N entries are used for storing (i.e., when the array is full), the newly obtained parameters can be stored by removing one entry and then adding the new parameters in the array.
    a. As an example, this may be done in a FIFO (first-in-first-out) fashion, where the last entry in the array (i.e., the oldest set of parameters) is removed when the array is full, and the new parameters are stored in the first element of the array.
    b. In another example, the ALF parameters replace certain stored parameters in the buffer having the same temporal ID, for example certain parameters may be the oldest parameters in the buffer, or less used, or any other rule may be applied.
3. A nonnegative index value, calledprevIdx, may be signaled to identify which set of ALF parameters is loaded/used from the buffer for encoding/decoding.
    a. A variable length code such as unary code may be used to signal prevIdx. The total available number of parameters for a certain temporal Id can be counted in the stored buffer, and truncated binarization can be used to signal the prevIdx having total available number of filters minus 1 as a max index. However, truncated coding may introduce mismatch between encoder and decoder, for example when some pictures are lost in the transmission.
    b. The prevIdx can take values from 0 up to N−1. Depending on the type of hierarchical frame structure used for coding, the maximum value of prevIdx can be smaller.
    c. When coding a slice/picture, the possible candidates for temporal prediction may be decided by traversing the sets included in the array and all or some parameter sets with equal or smaller tId are treated as effective candidates.
    d. The signaling of the array entry (determining the ALF parameters used for coding) may depend on the temporal layer ID of the current frame being coded. Specifically, the prevIdx may correspond to a different entry in the array depending on the temporal layer ID of the current frame being encoded/decoded.
        i. As an example, illustrated in Table 2 below, prevIdx=1 may point to following two different entries in the array depending on the tId of the current frame being coded:
            1. prevIdx=1 corresponds to the $4^{th}$ entry in the array, storing Alf ($P_4$, 1), when coding a frame with tId=1, since it is the second possible option allowed for coding to preserve temporal scalability, where Alf ($P_4$, 1) is the first candidate signaled with prevIdx=0.
            2. prevIdx=1 corresponds to the $2^{nd}$ entry in the array, storing Alf ($P_2$, 2), when coding a frame with tId=2, since it is the second possible option allowed for coding, where Alf($P_1$, 1) is the first option corresponding to prevIdx=0.

TABLE 2

| Alf($P_1$, 1) | Alf($P_2$, 2) | Alf($P_3$, 2) | Alf($P_4$, 1) | Alf($P_5$, 3) | e. In case of a frame loss (e.g., due to a packet loss when sending the video bitstream through a network), decoder may choose not to add any entry to the array, it may introduce a dummy (that is, a preconfigured) entry, so even when the picture is lost a dummy entry is added to the buffer. In either case, as long as the methods listed above are applied, the temporal scalability is preserved. In other words, when a frame at higher level is lost (e.g., T3), the frames at lower layers are still decodable (e.g., T1 and T2).

f. In another example, pictures or slices in with the lower temporal Id may carry information about the ALF parameters of the higher temporal IDs, in this case if a picture with higher temporal ID is lost, the parameters can be obtained from the pictures with lower temporal ID. Those parameters may also include whether the higher temporal ID picture carries such ALF parameters, that those parameters or dummy (preconfigured) parameters may be added to the buffer.

g. In another example, decoder picture buffer management (DPB) methods can be applied to temporal ALF parameters handling, since DPB management includes handling of the lost pictures.

4. Depending on the importance of ALF parameters, (e.g., importance can be measured based on how frequently they are used or based on their temporal layer information), some of those important ALF parameters can be fixed and kept in the buffer until a next I-slice is coded. Such importance metric can be used to rank and reorder the entries to reduce the signaling overhead of signaling prevIdx (e.g., unary coding).

5. Additional decisions or restrictions on loading and storing ALF parameters (management of the buffer) can be made based on any other side information (in addition to temporal layer ID) or an importance measure that can be also stored with the ALF parameters.

6. Separate buffers can be used for separate coding luma and chroma channels. As a result, each sbuffer may have different signaling of prevIdx to determine ALF parameters used for luma and chroma channels separately.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 4A:
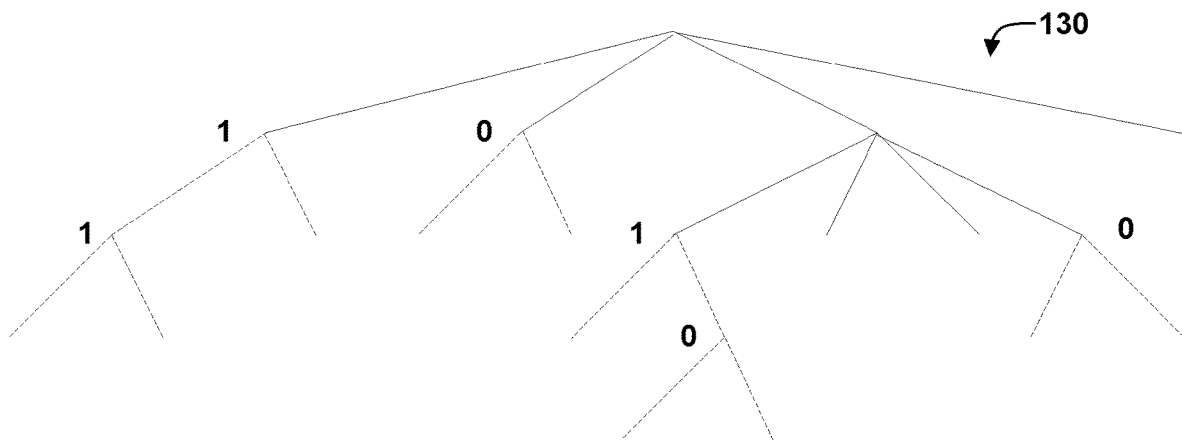
FIGS. 4A and 4B are conceptual diagrams illustrating an example quadtree binary tree (QTBT) structure, and a corresponding coding tree unit (CTU).
Figure 4B:
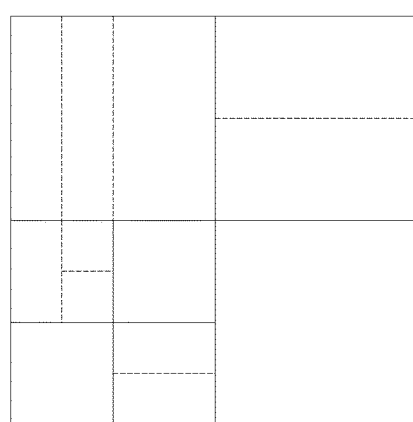

FIGS. 4A and 4B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 4B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 5:
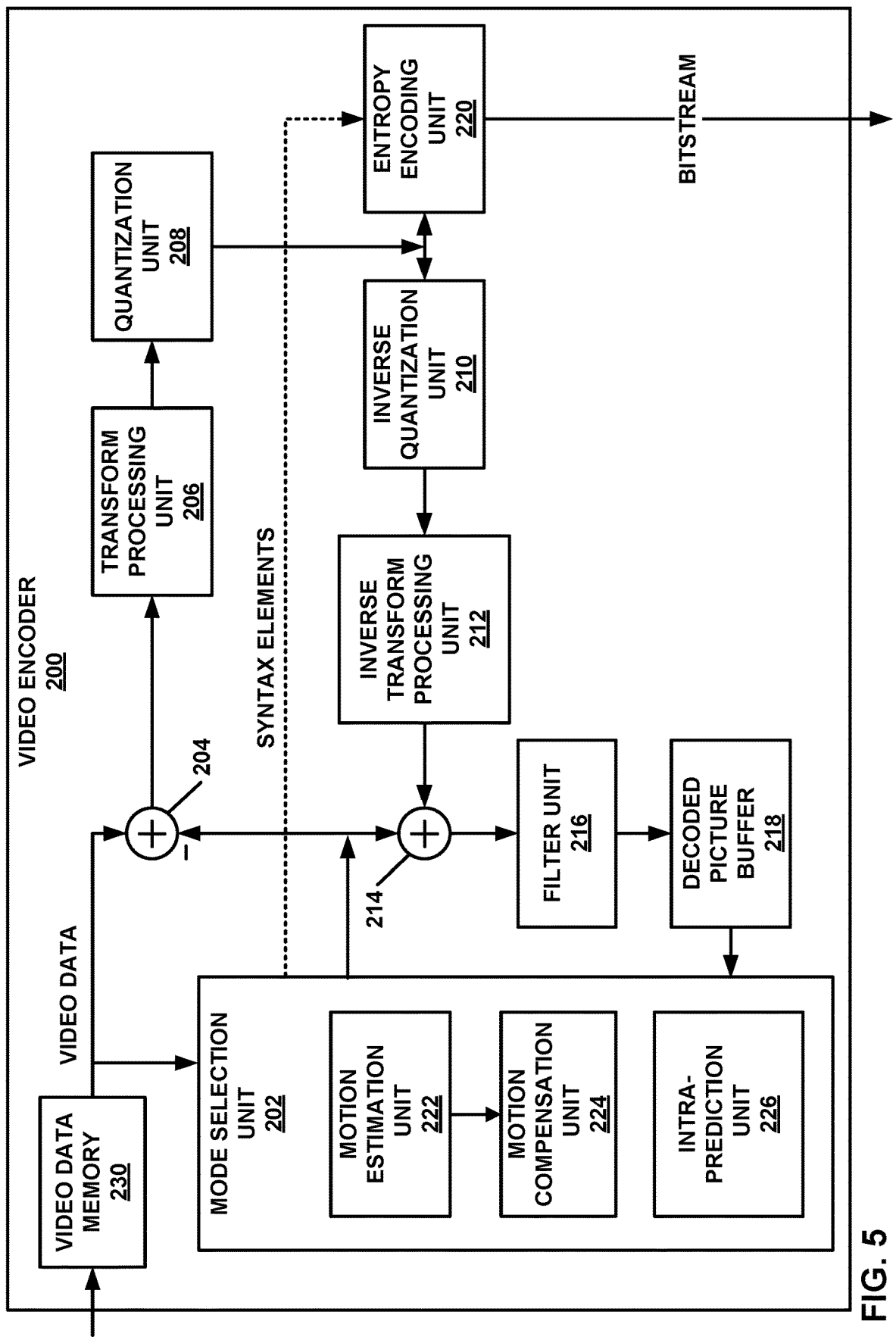
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 3). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 3 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 3) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. In accordance with the techniques of this disclosure, filter unit 216 may maintain an array including adaptive loop filter (ALF) parameters and associated temporal layer identifier (ID) values. The array may have a predefined size of N elements, where N is a non-negative integer value. The array may conform to the example of Table 1 as discussed above.

In this manner, when performing filtering of decoded blocks of video data of a current picture of a current temporal layer, filter unit 216 may use ALF parameters from the array that are from the same or a lower temporal layer.

In particular, filter unit 216 may compare the temporal layer IDs of the array elements to a current temporal layer ID value for the current picture, and select only those ALF parameters having temporal layer IDs that are less than or equal to the current temporal layer ID value to be used to filter the decoded blocks of the current picture.

Filter unit 216 may store ALF parameters in the array in a decoding order or other predetermined order. Thus, filter unit 216 may replace the existing ALF parameters in the array in a first-in-first-out (FIFO) fashion, or prioritize removal of ALF parameters at particular temporal layers from the array.

Filter unit 216 may determine certain ALF parameters in the array to be used for a current picture, and signal values representing which of the ALF parameters are used when filtering the current picture. Filter unit 216 may provide these values to entropy encoding unit 220, which may encode the values using a unary code.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to store sets of adaptive loop filter (ALF) parameters in a one-dimensional array having a predefined size of N memory elements, N being a positive integer value, comprising storing, in one or more of the memory elements of the array, both corresponding ALF parameters and a temporal layer identifier (ID) value indicating a temporal layer from which the corresponding ALF parameters are to be estimated; decode one or more blocks of video data; and filter the one or more blocks using the ALF parameters of the one-dimensional array.

Figure 6:
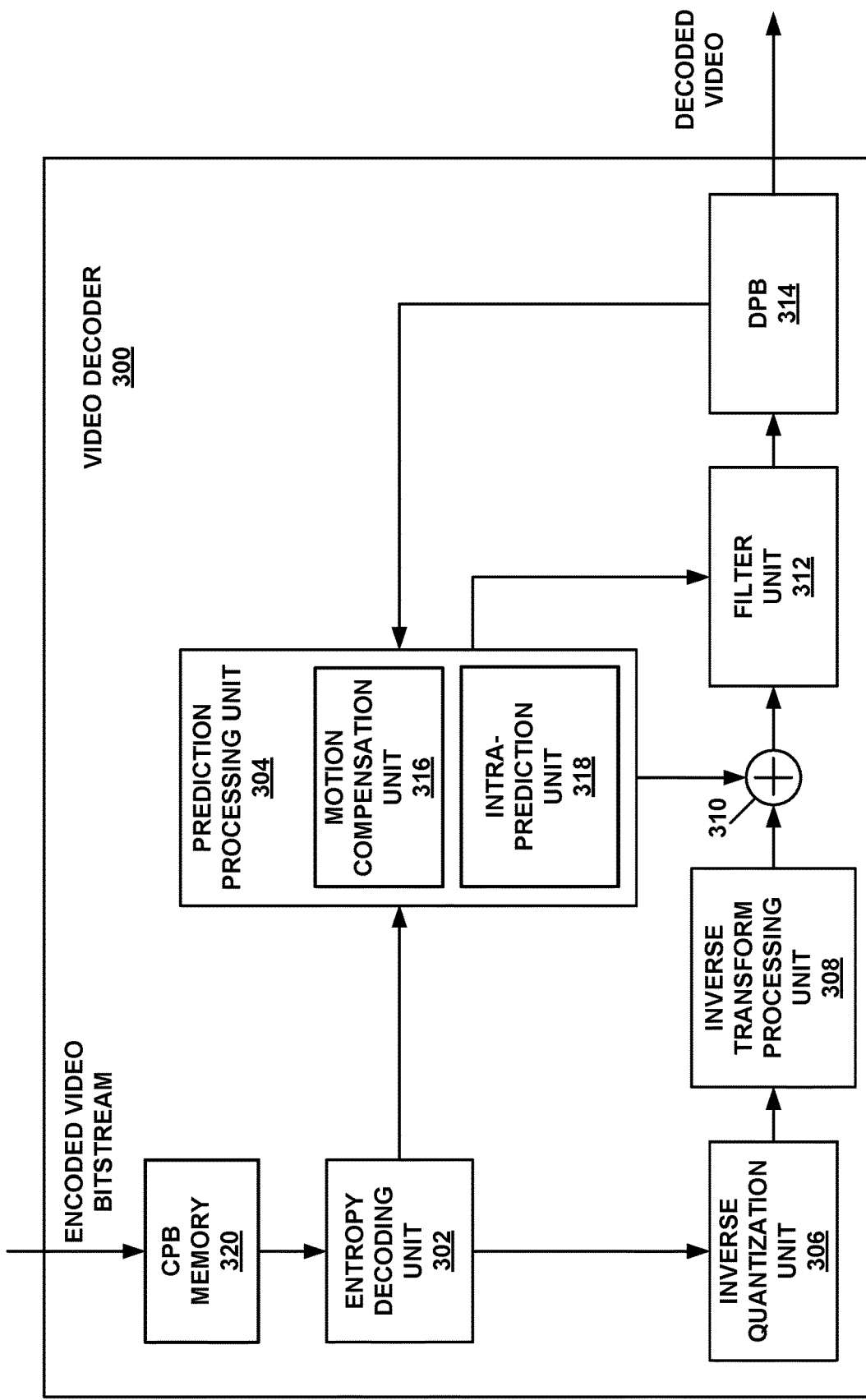
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 3). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 3). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In accordance with the techniques of this disclosure, filter unit 312 may maintain an array including adaptive loop filter (ALF) parameters and associated temporal layer identifier (ID) values. The array may have a predefined size of N elements, where N is a non-negative integer value. The array may conform to the example of Table 1 as discussed above.

In this manner, when performing filtering of decoded blocks of video data of a current picture of a current temporal layer, filter unit 312 may use ALF parameters from the array that are from the same or a lower temporal layer. In particular, filter unit 312 may compare the temporal layer IDs of the array elements to a current temporal layer ID value for the current picture, and select only those ALF parameters having temporal layer IDs that are less than or equal to the current temporal layer ID value to be used to filter the decoded blocks of the current picture.

Filter unit 312 may store ALF parameters in the array in a decoding order or other predetermined order. Thus, filter unit 312 may replace the existing ALF parameters in the array in a first-in-first-out (FIFO) fashion, or prioritize removal of ALF parameters at particular temporal layers from the array.

In some examples, entropy decoding unit 302 may entropy decode values (e.g., unary coded values) representing which ALF parameters are to be used when filtering a current picture. Entropy decoding unit 302 may provide these values to filter unit 312, which may determine the ALF parameters in the array to be used for a current picture from the values.

Video decoder 300 may store the filtered, reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 3.

In this manner, video decoder 300 represents an example of a video decoding device including a memory configured to store video data, and one or more processing units implemented in circuitry and configured to store sets of adaptive loop filter (ALF) parameters in a one-dimensional array having a predefined size of N memory elements, N being a positive integer value, comprising storing, in one or more of the memory elements of the array, both corresponding ALF parameters and a temporal layer identifier (ID) value indicating a temporal layer from which the corresponding ALF parameters are to be estimated; decode one or more blocks of video data; and filter the one or more blocks using the ALF parameters of the one-dimensional array.

Figure 7:
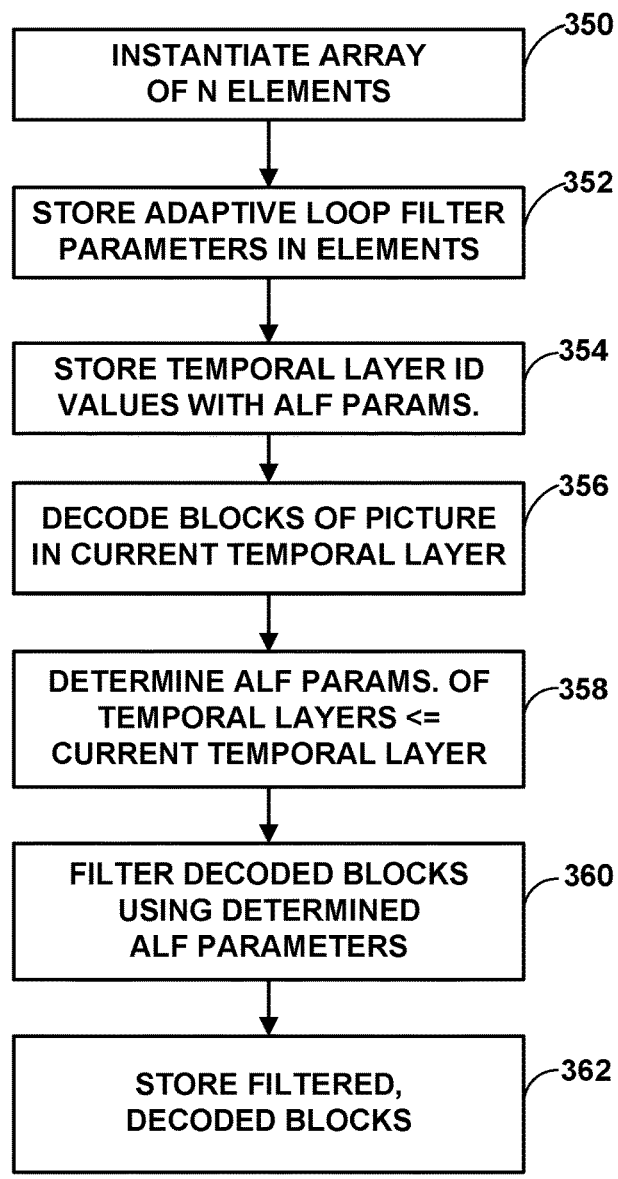
FIG. 7 is a flowchart illustrating an example method of decoding and filtering video data according to the techniques of this disclosure.

FIG. 7 is a flowchart illustrating an example method of decoding and filtering video data according to the techniques of this disclosure. The method of FIG. 7 is explained with respect to video decoder 300 of FIG. 6 for purposes of explanation. However, it should be understood that other video coding devices may be configured to perform this or a similar method. For example, video encoder 200 may perform a similar method, including encoding blocks of video data prior to decoding the blocks of video data, where decoding and filtering is performed by motion compensation unit 224, intra-prediction unit 226, inverse quantization unit 210, inverse transform processing unit 212, reconstruction unit 214, and filter unit 216 of video encoder 200.

Initially, video decoder 300 may instantiate an array of N elements (350), where N is a non-negative integer value. Video decoder 300 may instantiate the array in, for example, a memory including DPB 314, a memory of filter unit 312, or other memory within video decoder 300. In general, references to a "memory" should be understood as including any or all of these memories, or memories external to video decoder 300, such as memory 120 of FIG. 3.

Video decoder 300 may store adaptive loop filter (ALF) parameters in elements of the array (352). In particular, as shown in Table 1 above, video decoder 300 may store the actual ALF parameters in elements (i.e., cells) of the array, along with storing respective temporal layer identifier (ID) values with the ALF parameters (354). That is, the temporal layer ID values indicate temporal layer ID values of pictures from which the ALF parameters are estimated or are to be estimated.

Video decoder 300 may then decode one or more blocks of a current picture in a current temporal layer (356). For example, video decoder 300 may predict the blocks using inter-prediction performed by motion compensation unit 316 and/or intra-prediction performed by intra-prediction unit 318, forming prediction blocks. Video decoder 300 may also inverse quantize and inverse transform quantized transform coefficients using inverse quantization unit 306 and inverse transform processing unit 308, forming residual blocks including residual samples. Reconstruction unit 310 may then combine the residual blocks with the corresponding prediction blocks on a sample-by-sample basis to form decoded blocks for the current picture.

Filter unit 312 may then perform adaptive loop filtering of the decoded blocks of the current picture. In particular, according to the techniques of this disclosure, filter unit 312 may determine a current temporal layer ID for the current picture and determine ALF parameters of the array having temporal layer IDs less than or equal to the current temporal layer ID to the filtering process performed on the decoded blocks. Filter unit 312 may then filter the decoded blocks using the determined ALF parameters (360). In this manner, video decoder 300 may avoid applying ALF parameters of pictures having a higher temporal layer ID than the current temporal layer ID to the decoded blocks of the current picture.

Video decoder 300 may then store the filtered, decoded blocks in DPB 314 (362). Video decoder 300 may ultimately output a decoded picture including the filtered, decoded blocks, and also use the decoded picture as a reference picture for a picture to be decoded subsequently. Video decoder 300 may update the ALF parameters in the array using decoded video data, e.g., decoded parameters of the bitstream and/or data determined from the decoded picture itself.

In some cases, adding ALF parameters to the array may exceed the size of N of the buffer. In such cases, video decoder 300 may remove existing parameters from the buffer, e.g., in a first-in-first-out (FIFO) fashion. Thus, video decoder 300 may remove the oldest ALF parameters from the array and add the newest ALF parameters in place of the removed, oldest ALF parameters.

In this manner, the method of FIG. 7 represents an example of a method of decoding video data including storing sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and a temporal layer identifier (ID) value indicating a temporal layer from which the corresponding ALF parameters are to be estimated; decoding one or more blocks of video data; and filtering the one or more blocks using the ALF parameters of the one-dimensional array.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    storing sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and an identifier (ID) value indicating one or more parameter sets that are effective candidates for temporal prediction of the corresponding ALF parameters, the sets of ALF parameters defining ALF coefficients of respective ALF filters;
    decoding one or more blocks of video data, including, for at least one of the blocks of the one or more blocks:
        determining a reference picture in a decoded picture buffer to be used to decode the at least one of the blocks, the reference picture being separate from each of the one or more parameter sets and from the one-dimensional array having the predefined size of N memory elements;
        forming a prediction block for the at least one of the blocks from the reference picture; and
        combining a residual block for the at least one of the blocks with the prediction block to form a decoded block for the at least one of the blocks; and
    filtering the one or more blocks, including the at least one of the blocks, using the ALF parameters of the one-dimensional array.

2. The method of claim 1, wherein storing the sets of ALF parameters comprises storing the ALF parameters from at least one of a B-slice or a P-slice.

3. The method of claim 1, wherein storing the sets of ALF parameters comprises storing the sets of ALF parameters in a determined order.

4. The method of claim 3, wherein the determined order comprises a decoding order.

5. The method of claim 3, wherein when a new set of ALF parameters is received and all of the N memory elements are used, the method further comprises:
    removing one entry from one of the memory elements; and
    storing the new set of ALF parameters in the one of the memory elements.

6. The method of claim 5, wherein removing the one entry comprises selecting the one of the memory elements according to a first-in-first-out (FIFO) order.

7. The method of claim 5, wherein removing the one entry comprises selecting the one of the memory elements such that the one of the memory elements has a common ID value with an ID value of the new set of ALF parameters.

8. The method of claim 1, further comprising maintaining a previous index variable having a value representing which of the sets of the ALF parameters is to be used for the filtering.

9. The method of claim 8, wherein the previous index variable has a unary code format.

10. The method of claim 8, wherein the value of the previous index variable ranges from 0 to N−1.

11. The method of claim 8, wherein the one or more blocks are included in a picture having a current ID, and wherein filtering comprises filtering the one or more blocks using the ALF parameters included in the array having IDs equal to or smaller than the current ID.

12. The method of claim 8, further comprising coding a value representing an entry of the array according to an ID of a current picture being coded.

13. The method of claim 1, further comprising:
    detecting that a picture has been lost from a bitstream including the video data; and
    adding a preconfigured set of ALF parameters for the picture that has been lost.

14. The method of claim 1, wherein a first slice of the video data includes the one or more blocks, the method further comprising preventing removal of one or more of the stored sets of ALF parameters from the one-dimensional array until after decoding an intra-predicted slice (I-slice) of the video data subsequent to the first picture in decoding order.

15. The method of claim 1, further comprising encoding the one or more blocks prior to decoding the one or more blocks.

16. A device for decoding video data, the device comprising
a memory configured to store video data; and
one or more processors implemented in circuitry and configured to:
  store sets of adaptive loop filter (ALF) parameters in a one-dimensional array in the memory, the one-dimensional array having a predefined size of N memory elements, N being a positive integer value, wherein the one or more processors are configured to store, in one or more of the memory elements of the array, both corresponding ALF parameters and an identifier (ID) value indicating one or more parameter sets that are effective candidates for temporal prediction of the corresponding ALF parameters, the sets of ALF parameters defining ALF coefficients of respective ALF filters;
  decode one or more blocks of the video data, wherein to decode at least one of the blocks of the one or more blocks, the one or more processors are configured to:
    determine a reference picture in a decoded picture buffer to be used to decode the at least one of the blocks, the reference picture being separate from each of the one or more parameter sets and from the one-dimensional array having the predefined size of N memory elements;
    form a prediction block for the at least one of the blocks from the reference picture; and
    combine a residual block for the at least one of the blocks with the prediction block to form a decoded block for the at least one of the blocks; and
  filter the one or more blocks using the ALF parameters of the one-dimensional array.

17. The device of claim 16, wherein the one or more processors are configured to store the sets of ALF parameters in a decoding order.

18. The device of claim 17, wherein when a new set of ALF parameters is received and all of the N memory elements are used, the one or more processors are configured to:
  select one of the memory elements according to a first-in-first-out (FIFO) order;
  remove the selected one of the memory elements; and
  store the new set of ALF parameters in the selected one of the memory elements.

19. The device of claim 16, wherein the one or more processors are configured to maintain a previous index variable having a value representing which of the sets of the ALF parameters is to be used for the filtering.

20. The device of claim 19, wherein the one or more blocks are included in a picture having a current ID, and wherein the one or more processors are configured to filter the one or more blocks using the ALF parameters included in the array having IDs equal to or smaller than the current ID.

21. The device of claim 19, wherein the one or more processors are further configured to code a value representing an entry of the array according to an ID of a current picture being coded.

22. The device of claim 16, wherein the one or more processors are further configured to encode the one or more blocks prior to decoding the one or more blocks.

23. The device of claim 16, further comprising a display configured to display the video data.

24. The device of claim 16, wherein the device comprises one or more of a camera, a computer, a mobile device, a broadcast receiver device, or a set-top box.

25. A non-transitory computer-readable storage medium having stored thereon instructions that, when executed, cause a processor to:
  store sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and an identifier (ID) value indicating one or more parameter sets that are effective candidates for temporal prediction of the corresponding ALF parameters, the sets of ALF parameters defining ALF coefficients of respective ALF filters;
  decode one or more blocks of video data, wherein the instructions that cause the processor to decode the one or more blocks include instructions that cause the processor to decode at least one of the one or more blocks, including instructions that cause the processor to:
    determine a reference picture in a decoded picture buffer to be used to decode the at least one of the blocks, the reference picture being separate from each of the one or more parameter sets and from the one-dimensional array having the predefined size of N memory elements;
    form a prediction block for the at least one of the blocks from the reference picture; and
    combine a residual block for the at least one of the blocks with the prediction block to form a decoded block for the at least one of the blocks; and
  filter the one or more blocks using the ALF parameters of the one-dimensional array.

26. The non-transitory computer-readable storage medium of claim 25, further comprising instructions that cause the processor to store the sets of ALF parameters in a decoding order.

27. The non-transitory computer-readable storage medium of claim 25, further comprising instructions that cause the processor to maintain a previous index variable having a value representing which of the sets of the ALF parameters is to be used for the filtering.

28. The non-transitory computer-readable storage medium of claim 25, further comprising instructions that cause the processor to encode the one or more blocks prior to decoding the one or more blocks.

29. A device for decoding video data, the device comprising:
  means for storing sets of adaptive loop filter (ALF) parameters in a one-dimensional array having a predefined size of N memory elements, N being a positive integer value, wherein storing the sets of ALF parameters comprises storing, in one or more of the memory elements of the array, both corresponding ALF parameters and an identifier (ID) value indicating one or more parameter sets that are effective candidates for temporal prediction of the corresponding ALF parameters, the sets of ALF parameters defining ALF coefficients of respective ALF filters;

means for decoding one or more blocks of video data, including means for decoding at least one block of the one or more blocks, the means for decoding the at least one block including:
- means for determining a reference picture in a decoded picture buffer to be used to decode the at least one of the blocks, the reference picture being separate from each of the one or more parameter sets and from the one-dimensional array having the predefined size of N memory elements;
- means for forming a prediction block for the at least one of the blocks from the reference picture; and
- means for combining a residual block for the at least one of the blocks with the prediction block to form a decoded block for the at least one of the blocks; and means for filtering the one or more blocks using the ALF parameters of the one-dimensional array.

30. The device of claim 29, further comprising means for encoding the one or more blocks of video data prior to decoding the one or more blocks of video data.

* * * * *